United States Patent [19]

Osborne

[11] 3,996,389
[45] Dec. 7, 1976

[54] STABILIZER BLEND

[75] Inventor: John Thomas Osborne, Wayzata, Minn.

[73] Assignee: General Mills Chemicals, Inc., Minneapolis, Minn.

[22] Filed: Feb. 25, 1976

[21] Appl. No.: 661,197

[52] U.S. Cl. .............................. 426/565; 426/573; 426/654

[51] Int. Cl.$^2$ .......................................... A23G 9/00

[58] Field of Search .......... 426/565, 566, 567, 573, 426/654

[56] References Cited

UNITED STATES PATENTS

| | | | |
|---|---|---|---|
| 2,502,397 | 3/1950 | Werbin | 426/567 |
| 3,800,036 | 3/1974 | Gabby et al. | 426/566 |
| 3,914,440 | 10/1975 | Witzig | 426/565 |

OTHER PUBLICATIONS

Arbuckle, Ice Cream 2nd Ed. Avi Pub. Co., Westport, Conn., 1972, pp. 100 and 102 and 103.

*Primary Examiner*—Jeanette M. Hunter
*Attorney, Agent, or Firm*—G. O. Enockson; P. J. Span; Elizabeth Tweedy

[57] ABSTRACT

Stabilizer component for ice cream, ice milk, sherbet and like products.

5 Claims, No Drawings

STABILIZER BLEND

FIELD OF THE INVENTION

This invention relates to an improvement in the formulation of ice cream, ice milk, sherbet and like products. More particularly, this invention relates to ice cream, ice milk, sherbet and equivalent compositions containing a stabilizer component consisting essentially of guar gum and xanthomonas gum.

BACKGROUND OF THE INVENTION

Ice cream, ice milk, sherbet compositions and like compositions basically contain milk solids, fat, sugar and water in varying amounts. The fat and water form an emulsion in which the non-fat milk solids and sugar are distributed in colloidal form or dissolved. At the present time, the accepted identification of ice cream, ice milk and sherbet indicates compositions containing butterfat. There are, however, like products on the market in which the butterfat has been replaced by vegetable or animal fat. These equivalent products are included in the scope of the present invention.

The amounts and proportions of the basic constituents in the above products vary widely. Broadly they contain from about 1% to 16% fat, about 6% to 20% non-fat milk solids, about 8% to 18% sugar and about 35% to 85% water all by weight of the total composition. A typical ice cream composition basically contains from about 4% to 16% butterfat, about 6% to 14% non-fat milk solids, about 8% to 18% sugar and about 35% to 45% water all by weight of the total ice cream composition. Ice milk, traditionally contains about 3% to 7% butterfat and from about 14% to 20% non-fat milk solids by weight of the ice milk composition. Sherbets traditionally contain about 1% to 2% fat, about 3% to 5% non-fat milk solids and about 75% to 85% water by weight based upon the total sherbet composition. Hereinafter, the term ice cream shall mean and include ice cream, ice milk, sherbet and equivalent products described above.

Corn syrup solids are frequently added to the mixtures to enhance smoothness and add sweetness and solids to the mixtures. Emulsifiers such as monoglycerides or polysorbates are also frequently added to help maintain the fat in water emulsions. Stabilizers may be added to prevent the water from separating out of the mixture and forming ice and leaving the other ingredients in a dense mass.

Commercially produced products of the above type are generally packaged and put into marketing channels in which they may not remain completely hard frozen at all times. Cyclical storage temperatures of 0° to 40° F. are to be expected in the course of wholesale and retail distribution. Without some means of stabilizing a mixture, the temperature changes cause separation of the water from the other constituents. Such separation is frequently called "wheying out." Wheying out, in turn, causes iciness, chewiness or melting in the mouth which is too fast for good quality products.

Heretofore, carrageenan gum colloids have been incorporated into commercially produced products to prevent separation during processing and storage. The capability of carrageenan gum to stabilize such products has been attributed to an interaction with the milk protein. While carrageenan gum can be used alone, commercially it is generally used in combinations with other gums. At the present carrageenan is used in combination with guar gum, locust bean gum, caboxymethyl cellulose or in combinations thereof. Usually the carrageenan gum makes up from about 1% to 10% by weight of the stabilizers composition. The use of the above stabilizers has the disadvantage of substantially raising the viscosity of the initial product mixture and, thereby, making the actual manufacturing process slower than it could be without the increase in viscosity.

A combination of xanthomonas gum, locust bean gum and guar gum has been mentioned in the art as stabilizers for ice cream. This combination, when evaluated by the inventors, produced ice cream mixes exhibiting viscosities which were only slightly lower than those stabilized with carrageenan gum containing stabilizers. A number of natural gums have been evaluated by the inventors to determine their stabilizing effect upon ice cream. Locust bean gum alone produced a mixture that did not whip. Guar gum produced a curdled mixture. Xanthomonas gum alone produced an icy, chewy mixture.

SUMMARY OF THE INVENTION

It has now been found that ice cream, ice milk, sherbet and like products containing a stabilizer component consisting essentially of xanthomonas gum and guar gum exhibit substantially lower mix viscosities than such mixes stabilized with any of the stabilizers discussed above. In addition, the compositions stabilized by the combined guar gum and xanthomonas gum component exhibited superior resistance to separation when exposed to changing temperatures. According to the present invention an ice cream, ice milk, sherbet and like mixture is stabilized with a stabilizing component consisting essentially of about 99% to 90% guar gum by weight of the total component and about 1% to 10% xanthomonas gum by weight of the total component. Most preferred is the stabilizer component containing about 2% to 8% xanthomonas gum and about 98% to 92% guar gum both based upon the total weight of the stabilizer component. The stabilizing component is generally used in an amount of about 0.10% to 3.0% by weight of the product mixture with the provision that the amount used is sufficient to stabilize the mixture without causing a particular mixture to curdle. Curdling occurs when the amount of guar gum present exceeds the tolerance of any particular mixture. The maximum amount of the stabilizer component which can be used will be determined by the particular composition of the basic mixture. The component is preferably used in ice cream mixtures in an amount of about 0.10% to 0.25% by weight of a total ice cream mixture and in ice milk in an amount of about 0.25% to 3.0% by weight of the ice milk mixture. In non-chocolate products somewhat more stabilizer in the range of about 0.15% to 0.30% by weight of the product formulation is used than is used in chocolate products.

Ice cream mixtures containing the above stabilizing component exhibit improved stability during cyclical temperature storage. Comparative stability test are shown below in the specific examples. In these particular instances ice cream mixes were frozen and then periodically thawed and refrozen.

In addition to the storage stability attained by employing the above stabilizing component, a relatively low initial viscosity was retained in the ice cream mixtures. Because the viscosity of the ice cream mixtures was substantially lower than those observed using other stabilizer components, the mixtures are more easily passed through processing equipment such as pumps, mixers and pasteurizers than ice cream mixtures stabilized with carrageenan gum. The increased speed of flow makes shorter processing time possible.

DETAILS OF THE INVENTION

Guar gum is obtained from the endosperm of the guar bean and subsequently dried and ground. In the practice of this invention guar gum having a particle size of about 100 to 200 mesh U.S. Standard Sieve is preferred. Particular particle sizes may give better performance when used in particular manufacturing equipment than others.

Xanthomonas gum is one component in the stabilizer component of the present invention. Xanthomonas gum can be made by the fermentation of carbohydrate with bacteria of the genus Xanthomonas. Representative of these bacteria are *Xanthomonas campestris, Xanthomonas phaseoli, Xanthomonas mulvacearn, Xanthomonas carotae, Xanthomonas translucens Xanthomonas hederae* and *Xanthomonas papavericoli*. The gum produced by the bacteria *Xanthomonas campestris* is preferred for the purpose of this invention. The fermentation usually involves inoculating a fermentable broth containing a carbohydrate, various minerals and a nitrogen yielding compound. A number of modifications in the fermentation procedure and subsequent processing are commercially used.

The xanthomonas gum used in the blends of xanthomonas gum and guar gum discussed in detail below can be made according to the following procedure which is a typical commercial process. In the first step, the bacteria is grown on an agar slant. In the second step, bacteria from the slant is used to inoculate two liter aliquots of a fermentable broth containing per liter: sucrose, 20 grams; $Na_2HPO_4 \cdot 12H_2O$, 8 grams; $NaH_2PO_4$, 1 gram; $MgSO_4 \cdot 7H_2O$, 0.25 gram; and 90 grams of cooked soy meal dispersion. The cooked soy meal suspension is made by agitating at 180 rpm, 90 grams of soy meal in 600 ml. of water at a temperature of 90° C. for a period of 30 minutes and then centrifuging and discarding the residue. The above broth is allowed to ferment for a period of 31 hours at a temperature of about 28° to 30° C. In the third step, the broth is used to inoculate a 15 liter batch containing the same broth composition. The broth of the third step is allowed to ferment for a period of 29 hours at a temperature of about 28° to 30° C. The broth from the third step is used to inoculate a 15,000 liter batch of broth having the composition per liter of broth, sucrose 20 grams; cooked soy meal dispersion, 6 grams; rapeseed oil, 0.65 gram; sulfuric acid, 0.53 gram; $MgSO_4 \cdot 7H_2O$, 0.25 gram; $Na_2HPO_4 \cdot 12H_2O$, 15 grams and tap water. The final batch is allowed to ferment for a period of about 72 hours at a temperature of about 28° to 30° C. At the end of the final fermentation period, the broth is steam sterilized to destroy all the viable microorganisms. The pH of the broth is then adjusted to 7.9 by the addition of potassium hydroxide and the gum recovered from the broth by the addition of isopropyl alcohol.

The stabilizing component is mixed in with the other constituents of the product mixtures. The product mixture can then be processed either by a batch process or continuously.

Below are set out specific examples illustrating the benefits and advantages of the present invention.

The following procedure was used for making the ice cream samples set out in the Examples below. The dry and liquid ingredients were all combined by mixing in a pasteurizing vat. The stabilizer blends were mixed with sugar prior to mixing into the other components. The mixture was then pasteurized by heating for 30 minutes at a temperature of 151° F. and for 25 seconds at a temperature of 176° F. The mixture was homogenized in two stages at pressures of 1000 psig and 2500 psig respectively. The mixture was then cooled at a temperature of 32° to 41° F. for a period of one to two hours. The product was then vigorously agitated while being held at a temperature of about 19° to 23° F. to aerate the samples. About 50% of the free water was frozen during this procedure. The mixture was then placed in containers and hard frozen at a temperature of about −25° F. to −30° F.

The viscosity of each sample before freezing was measured at room temperature (72° F±2°) with a RVT Brookfield Viscometer equipped with a No. 2 spindle rotated at 20 rpm and the general appearance of each sample noted. The samples were then frozen, hardened and organoleptically tested. The samples were stored at a temperature of about 0°F. and periodically exposed to room temperature for a given period of time and then returned to storage. After each thawing, referred to as "heat shock", and refreezing, the samples were organoleptically evaluated. The results observed using (1) conventional stabilizer components, (2) the individual constituents of the stabilizer component of this invention and (3) the blended stabilizer component of this invention are set out below in the following specific examples. As used below, the terms "fast" or "slow" mean rate of melting in the mouth, "long" means elasticity and "tight" means small air cell formation.

EXAMPLE I

Evaluation of Stabilizing Characteristics of Guar Gum and Xanthomonas Gum Alone and Blended The stabilizers shown below were evaluated using the following ice cream formulation:

| % By Weight | |
|---|---|
| 11.00 | butterfat |
| 11.00 | non-fat milk solids |
| 12.00 | sucrose |
| 5.00 | corn syrup solids (DE 42) |
| 0.18 | stabilizer component |
| 60.82 | water | and the procedure for mixing, homogenizing, pasteurizing and freezing set out above in the specification.

The particular stabilizer component and the observations made in respect to the particular stabilizer component are shown below.

| STABILIZER COMPONENT % By Weight of Stabilizer Component | | |
|---|---|---|
| | Guar Gum | Xanthomonas Gum |
| Sample 1 | 100 | — |
| Sample 2 | — | 100 |
| Sample 3 | 94 | 6 |
| Sample 4 | 98 | 2 |

OBSERVATIONS - EXAMPLE I
Viscosity (cp) of Unfrozen Mix

|  | Unstirred | | Stirred | |
| --- | --- | --- | --- | --- |
|  | Aged 24 hrs | Aged 72 hrs | Aged 24 hrs | Aged 72 hrs |
| Sample 1 | 360 | 460 | 310 | 390 |
| Sample 2 | 310 | 390 | 590 | 670 |
| Sample 3 | 510 | 580 | 430 | 450 |
| Sample 4 | 360 | 430 | 290 | 350 |

Appearance of Initial Unfrozen Mix
| Sample 1 | curdled; no separation |
| --- | --- |
| Sample 2 | no separation |
| Sample 3 | no separation |
| Sample 4 | no separation |

After Hardening Characteristics
| Sample 1 | was not frozen |
| --- | --- |
| Sample 2 | good to slightly too long |
| Sample 3 | good |
| Sample 4 | good |

Over Run
| Sample 1 | — |
| --- | --- |
| Sample 2 | 70-80% |
| Sample 3 | 80% |
| Sample 4 | 80% |

Organoleptic Condition After Hardening
| Sample 1 | — |
| --- | --- |
| Sample 2 | & good melt down; smooth; very slightly icy; more than 3 or 4 |
| Sample 3 | good melt down; slow; smooth; chewy; tight |
| Sample 4 | good melt down; slow; smooth; chewy; tight; slightly faster than 3 |

The samples were stored at about 0° F. for a period of 21 days. The samples were heat shocked by exposure to room temperature for 30 minutes on the second, third and twenty-first days. The condition of the samples after refreezing is set out below.

HEAT SHOCK AND REFREEZING
Condition of Samples After Refreezing

|  | First Heat Shock and Refreezing | Second Heat Shock and Refreezing | Third Heat Shock and Refreezing |
| --- | --- | --- | --- |
| Sample 1 | was not frozen | was not frozen | was not frozen |
| Sample 2 | very slightly icy | icy | slightly to icy to icy |
| Sample 3 | slightly icy | very slightly icy | very slightly icy |
| Sample 4 | very slightly icy | very slightly icy | very slightly icy to slightly icy |

The results indicate that the blends of guar gum and xanthomonas gum are better stabilizers than either gum alone. The results show the tendency of guar gum to curdle ice cream mixes and, at the same time, to reduce ice formation in storage. Also illustrated is the effect of xanthomonas gum to modify the curdling tendencies of guar gum.

EXAMPLE II

Evaluation of Stabilizer Blends Containing Locust Bean Gum, Guar Gum, Xanthomonas Gum and Carrageenan Gum The stabilizers shown below were evaluated using the ice cream formulation shown in Example I and the procedure for mixing, homogenizing, pasteurizing and freezing set out above in the specification.

STABILIZER COMPONENT
% By Weight of Stabilizer Component

| Sample | Guar Gum | Locust Bean Gum | Xanthomonas Gum | Carrageenan Gum |
| --- | --- | --- | --- | --- |
| 1 | 50 | 42 | — | 8 |
| 2 | 50 | 42 | 8 | — |
| 3 | — | 92 | 8 | — |
| 4 | 92 | — | 8 | — |

OBSERVATIONS - EXAMPLE II
Viscosity (cp) of Unfrozen Mix

|  | Unstirred Aged 24 hrs | Stirred Aged 24 hrs |
| --- | --- | --- |
| Sample 1 | 1210 | 420 |
| Sample 2 | 680 | 380 |
| Sample 3 | 640 | 430 |
| Sample 4 | 490 | 380 |

Appearance
| Sample 1 | no separation |
| --- | --- |
| Sample 2 | no separation |
| Sample 3 | no separation |
| Sample 4 | no separation |

Organoleptic Condition After Hardening
| Sample 1 | slightly chewy; no iciness |
| --- | --- |
| Sample 2 | very slightly icy; goes fast |
| Sample 3 | Slightly icy; slightly brittle; goes fast; poor whip |
| Sample 4 | slightly chewy; goes very slightly fast; no iciness |

The samples were stored at about 0° F. for a period of 10 days. The samples were heat shocked for 30 minutes on the second, fourth, seventh and tenth days and refrozen. The condition of the samples after refreezing is set out below.

HEAT SHOCK AND REFREEZING
Condition of Samples After Refreezing

| Sample | First Heat Shock And Refreezing | Second Heat Shock And Refreezing | Third Heat Shock And Refreezing | Fourth Heat Shock And Refreezing |
| --- | --- | --- | --- | --- |
| 1 | no iciness; slightly chewy | slightly icy | icy | icy |
| 2 | slightly icy to icy | icy | very icy | very icy |
| 3 | slightly icy to icy | icy | very icy | very icy |
| 4 | no iciness to very slightly icy | very slightly icy to slightly icy | slightly icy to icy | icy |

The results show that the guar gum-xanthomonas gum blend was much more resistant to icing in storage than the blends containing xanthomonas gum and locust bean gum, and xanthomonas gum, locust bean gum and guar gum. The xanthomonas gum-guar gum blend was somewhat better than the carrageenan gum, locust bean gum and guar gum blend. The results also illustrate the higher viscosities observed in the unfrozen mixes when carrageenan or locust bean or both were present in the mix.

EXAMPLE III

Evaluation of Stabilizers Containing Guar Gum, Locust Bean Gum, Carrageenan Gum, Xanthomonas Gum and Carboxymethyl Cellulose The stabilizers shown below were evaluated using the ice cream formulation set out below:

| % By Weight | |
|---|---|
| 10.50 | butterfat |
| 10.50 | non-fat milk solids |
| 12.00 | sucrose |
| 5.00 | corn syrup solids DE=42 |
| .06 | monoglycerides* |
| .18 | stabilizer component |
| 61.76 | water |

*sold under Atmos 100K Trademark by Atlas Chemical Co.

and the procedure for mixing, homogenizing and pasteurizing set out above in the specification.

The particular stabilizer component and the observations made in respect to the particular stabilizer component are shown below:

STABILIZER COMPONENT
% By Weight of Stabilizer Component

| | Sample 1 | Sample 2 | Sample 3 | Sample 4 |
|---|---|---|---|---|
| Guar Gum | 50 | 56 | 94 | — |
| Locust Bean Gum | 42 | 44 | — | 42 |
| Carrageenan Gum | 8 | — | — | 8 |
| Xanthomonas Gum | — | — | 6 | — |
| Carboxymethyl Cellulose | — | — | — | 50 |

OBSERVATIONS - EXAMPLE III
Viscosity (cp) of Unfrozen Mix

| Sample | Unstirred Aged 24 hrs | Stirred Aged 24 hrs |
|---|---|---|
| 1 | 1260 | 360 |
| 2 | — | 220 |
| 3 | 320 | 230 |
| 4 | 2800 | 760 |

Appearance of Unfrozen Mix
Sample 1   no separation
Sample 2   50% separation
Sample 3   no separation
Sample 4   no separation Organoleptic Condition After Hardening
Sample 1   smooth
Sample 2   coarse, iciness
Sample 3   equivalent to 1
Sample 4   equivalent to 1

These samples were not storage tested. It is apparent that a blend of locust bean gum and guar gum does not stabilize ice cream even initially.

EXAMPLE IV

Evaluation of Stabilizer Components Containing Guar Gum, Locust Bean Gum, Xanthomonas Gum and Carrageenan Gum The stabilizers shown below were evaluated using the ice cream formulation set out below:

| % By Weight | |
|---|---|
| 11.00 | butterfat |
| 11.00 | non-fat milk solids |
| 12.00 | sucrose |
| 5.00 | corn syrup solids |
| 0.18 | stabilizer component |
| 0.06 | monoglycerides* |
| 0.02 | polysorbate 80** |
| 60.74 | water |

*sold under Trademark Atmos 150 by Atlas Chemical Co.
**sold under Trademark Tween 80 by Atlas Chemical Co.

and the procedure for mixing, homogenizing, pasteurizing and freezing set out above in the specification.

The particular stabilizer component and the observations made in respect to the particular stabilizer component are shown below:

STABILIZER COMPONENT
% By Weight of Stabilizer Component

| Sample | Guar Gum | Locust Bean Gum | Xanthomonas Gum | Carrageenan Gum |
|---|---|---|---|---|
| 1 | 50 | 42 | — | 8 |
| 2 | 94 | — | 6 | — |
| 3 | 96 | — | 4 | — |
| 4 | 94 | — | — | 6 |

OBSERVATIONS - EXAMPLE IV
Viscosity (cp) of Unfrozen Mix

| | Unstirred | | Stirred | |
|---|---|---|---|---|
| | Aged 1–2 hrs | Aged 24 hrs | Aged 1–2 hrs | Aged 24 hrs |
| Sample 1 | 575 | 690 | 295 | 380 |
| Sample 2 | 200 | 250 | 168 | 225 |
| Sample 3 | 190 | 245 | 165 | 222 |
| Sample 4 | 820 | 830* | 290 | 440 |

*viscosity measured at 10 rpm.

Appearance of Unfrozen Mix
Sample 1   no separation
Sample 2   no separation
Sample 3   no separation
Sample 4   no separation Over Run
Sample 1   100%
Sample 2   100%
Sample 3   100%
Sample 4   100%

Organoleptic Condition After Hardening
Sample 1   very slightly icy
Sample 2   very slightly icy
Sample 3   very slightly icy
Sample 4   very slightly icy The samples were stored at about 0° F. for a period of 15 days. The samples were heat shocked for 15 minutes on the fourth, eighth and fifteenth days and refrozen. The condition of the samples are refreezing is set out below.

HEAT SHOCK AND REFREEZING
Condition of Samples After Refreezing

| | First Heat Shock and Refreezing | Second Heat Shock and Refreezing |
|---|---|---|
| Sample 1 | equivalent to no heat shock | equivalent to no heat shock |
| Sample 2 | equivalent to no | equivalent to no |

-continued

HEAT SHOCK AND REFREEZING
Condition of Samples After Refreezing

| | First Heat Shock and Refreezing | Second Heat Shock and Refreezing |
|---|---|---|
| Sample 3 | heat shock equivalent to no heat shock | heat shock equivalent to no heat shock |
| Sample 4 | slightly more iciness and shrinkage | very icy |

The above observations illustrate the higher viscosities in the initial mix between the use of xanthomonas gum and carrageenan gum in the stabilizer component. It also indicates that carrageenan gum and guar gum blends performed less well than the other blends.

EXAMPLE V

Further Comparisons of Stabilizer Blends Containing Locust Bean Gum, Guar Gum, Xanthomonas Gum and Carrageenan Gum The stabilizer blends shown below were evaluated using the ice cream formulation shown above in Example I and the procedure for mixing, homogenizing and pasteurizing set out above in the specification.

STABILIZER COMPONENT
% By Weight of Stabilizer Component

| Sample | Guar Gum | Locust Bean Gum | Xanthomonas Gum | Carrageenan Gum |
|---|---|---|---|---|
| 1 | 50 | 42 | — | 8 |
| 2 | 92 | — | 8 | — |
| 3 | 94 | — | 6 | — |
| 4 | 96 | — | 4 | — |
| 5* | 94 | — | 6 | — |

*0.8% emulsifier by weight of total formulation, sold under the trademark Tween MOS 100 by Atlas Chemical Co. added to formulation and adjustment made in water content.

OBSERVATIONS - EXAMPLE V
Viscosity (cp) of Unfrozen Mix

| | Unstirred Aged 24 hours | Stirred Aged 24 hours |
|---|---|---|
| Sample 1 | 1000 | 470 |
| Sample 2 | 660 | 450 |
| Sample 3 | 630 | 430 |
| Sample 4 | 540 | 360 |
| Sample 5 | 490 | 360 |

| Appearance of Unfrozen Mix | |
|---|---|
| Sample 1 | no separation |
| Sample 2 | no separation |
| Sample 3 | no separation |
| Sample 4 | no separation |
| Sample 5 | no separation |

| Organoleptic Condition After Hardening | |
|---|---|
| Sample 1 | goes slightly fast |
| Sample 2 | slightly chewy |
| Sample 3 | similar to 1 but goes slightly faster |
| Sample 4 | goes slightly fast to fast; fastest melt |
| Sample 5 | goes slightly fast; more uniform and smaller air cells |

The samples were stored at about 0° F. for a period of 30 days. The sample were heat shocked for 15 minutes at room temperature about 75° F. on the 6th, 9th, 27th and 36th days and then refrozen. The condition of the samples after refreezing is set out below:

HEAT SHOCK AND REFREEZING
Condition of Samples After Refreezing

| Sample | First Heat Shock And Refreezing | Second Heat Shock And Refreezing | Third Heat Shock And Refreezing | Fourth Heat Shock And Refreezing |
|---|---|---|---|---|
| 1 | very slightly icy | very slightly icy to slightly icy | slightly icy | slightly icy to icy |
| 2 | very slightly icy; smooth | very slightly icy | slightly less icy than 1 | slightly icy; tight |
| 3 | very slightly icy | very slightly icy | slightly less icy than 1 | slightly icy; chewy; very slightly gummy |
| 4 | very slightly icy to slightly icy | very slightly icy | slightly less icy than 3 | very slightly icy; tight body |
| 5 | smooth very slightly icy | very slightly icy; slightly smooth | slightly smooth; slightly icy | slightly icy; not tight |

The above results again illustrate the decrease in iciness using xanthomonas gum and guar gum and the decrease in the viscosity of the unfrozen mix over mixes containing carrageenan gum.

The embodiments of the invention in which an exclusive property or privilege is claimed are defined as follows:

1. An ice cream composition which is stabilized and uncurdled which comprises a stabilizing component consisting essentially of xanthomonas gum and guar gum.

2. The composition of claim 1 wherein the stabilizer component consists essentially of about 1% to 10% xanthomonas gum by weight of the total stabilizer component and about 99% to 90% guar gum by weight of the total stabilizer component.

3. The composition of claim 2 wherein the stabilizer component is present in the composition in an amount of about 0.10% to 3.0% by weight of the total composition.

4. The composition of claim 3 wherein said composition comprises about 1% to 16% fat, about 6% to 20% non-fat milk solids, about 8% to 18% sugar and about 35% to 85% water all by weight of the total composition.

5. An ice cream composition comprising about 4% to 16% butterfat, about 6% to 14% non-fat milk solids, about 8% to 18% sugar, about 35% to 45% water and about 0.10% to 0.30% stabilizer component, all by weight of the ice cream composition, said stabilizer component consisting essentially of about 2% to 8% xanthomonas gum and about 98% to 92% guar gum both by weight of the total stabilizer component.

* * * * *